Aug. 22, 1939.   B. S. AIKMAN   2,170,229
TRAIN BRAKE MECHANISM
Filed April 8, 1938   2 Sheets-Sheet 1
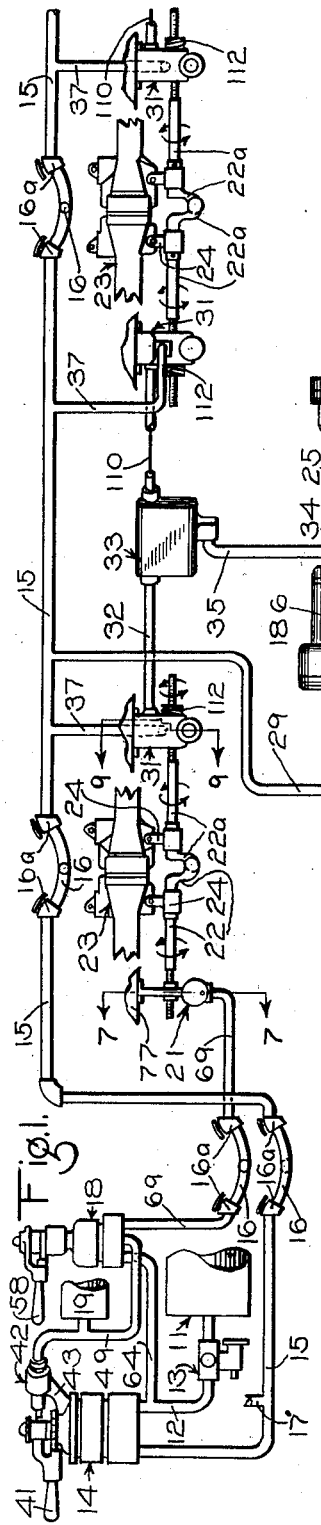
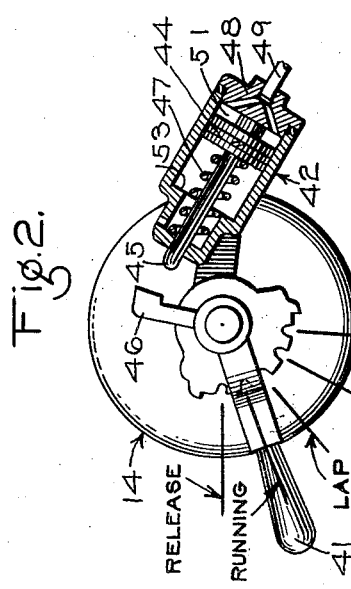
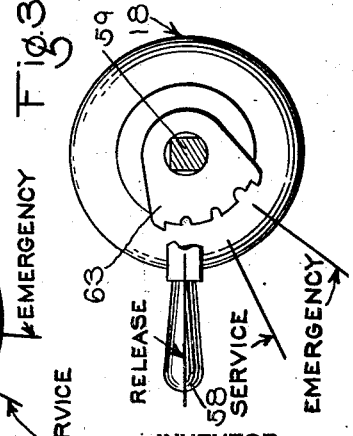
INVENTOR
BURTON S. AIKMAN
BY
ATTORNEY Aug. 22, 1939.   B. S. AIKMAN   2,170,229
TRAIN BRAKE MECHANISM
Filed April 8, 1938    2 Sheets-Sheet 2
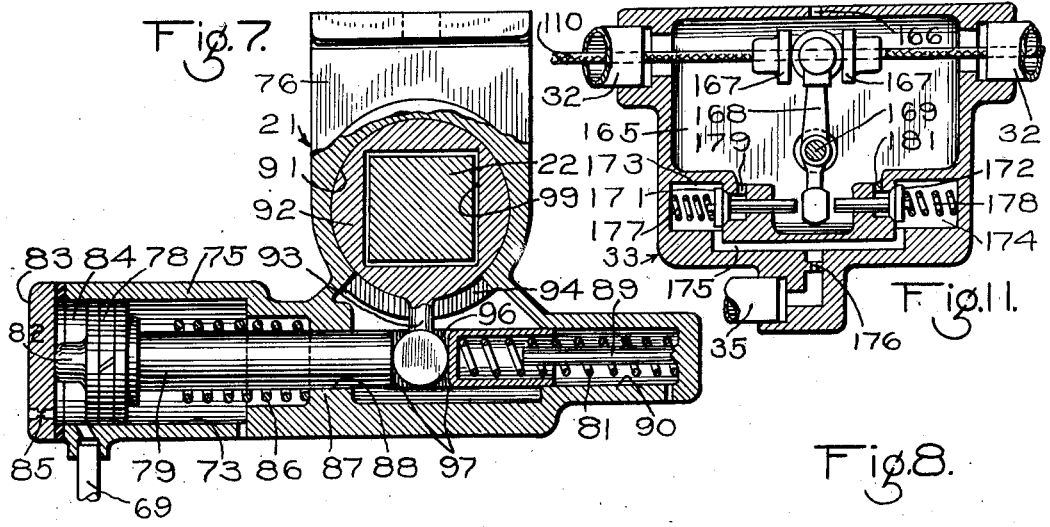
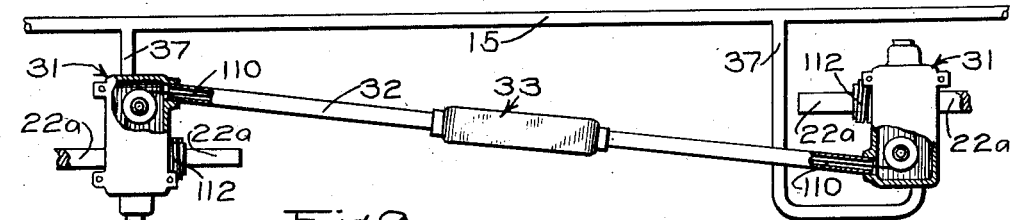
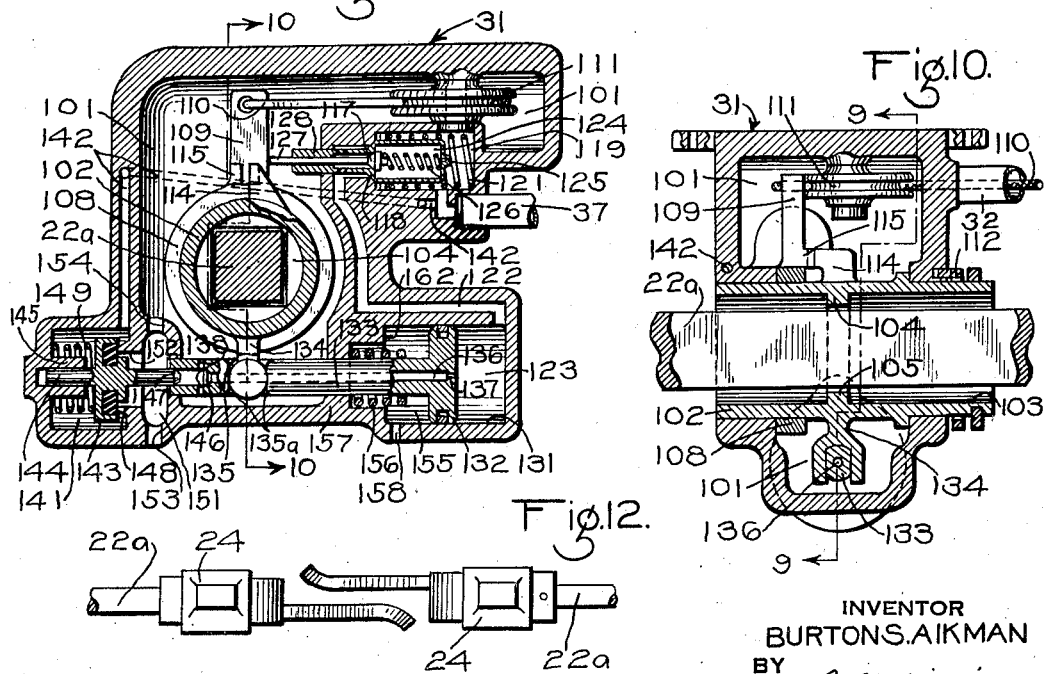
INVENTOR
BURTON S. AIKMAN
BY
ATTORNEY Patented Aug. 22, 1939

2,170,229

UNITED STATES PATENT OFFICE 2,170,229

TRAIN BRAKE MECHANISM

Burton S. Aikman, Wilkinsburg, Pa., assignor to The Westinghouse Air Brake Company, Wilmerding, Pa., a corporation of Pennsylvania Application April 8, 1938, Serial No. 200,915

23 Claims. (Cl. 303—13)

This invention relates to train brake mechanisms and particularly to train brake mechanisms including a train or brake pipe in which variations of pressure control the application and the release of the brakes.

It was recognized by those working in the art at a very early date that a desired manner in which to apply the brakes on a train of cars is to effect application on all the cars as nearly simultaneously as possible so that all the cars are retarded at the same rate, in which case harsh running-in of slack, which produces intolerable shock to the cars is prevented. Because electricity travels at least with the speed of light, it was proposed at an early date to control the brakes on the cars of the train electrically in order to secure the simultaneous application of the brakes on all the cars. Due to the possibility of faulty or high resistance connections between the sections of train wires on successive cars and the possibility of breakage or grounding of the train wires, the electrically controlled type of train brake equipment was not generally favored in practice and the more reliable and dependable fluid pressure operated and controlled type of brake equipment, wherein the application and release of the brakes is controlled by variation of fluid pressure in a train or brake pipe, was adopted and successfully developed.

In the conventional fluid pressure operated train brake equipment the pressure in the brake pipe is reduced or increased by a brake valve device on a car, such as the locomotive, at the head end of the train and application and release of the brakes on the cars accordingly depends upon the speed of propagation of the pressure reduction or pressure increase wave through the brake pipe. The maximum speed of propagation of a pressure reduction or pressure increase wave in the brake pipe in the earlier types of fluid pressure operated brake equipment employing the so-called The Westinghouse "K" triple valve, was slightly greater than half the speed of sound in air, that is, approximately six hundred feet per second.

Due to the relatively slow speed of propagation of a pressure reduction or pressure increase wave through the brake pipe, there is accordingly an appreciable time lag between the application or release of the brakes at the head end of a train and the application or release of the brakes at the rear end of the train and, in exceptionally long trains having in excess of seventy-five cars, this resulted in such a delay of the application of the brakes at the rear end of the train, following application of the brakes at the head end of the train that intolerable shocks and jars to the cars due to run-in of slack were experienced.

In order to maintain low operating costs, it has become necessary for railroads to run freight trains in excess of one hundred cars, and thus in order to secure dependable and proper operation of the brakes, an entirely new type of freight brake equipment was developed in recent years, known as the Westinghouse "AB" freight brake equipment. This latest type of brake equipment has numerous improved features, an important one of which is that it effects a great increase in the speed of propagation of a pressure reduction or pressure increase wave through the brake pipe, so that even on exceptionally long trains the application of the brakes on all the cars of the train is effected in a manner such as to prevent the intolerable shocks and jars to the cars due to harsh running-in or running-out of the slack in the train.

In more recent years the advent of very high speed passenger trains has made necessary even higher rates of propagation of brake applications and release, and accordingly brake equipments have been developed which have a primary or electrical control, and a secondary or pneumatic control, so that if an electrically controlled application of the brakes is initiated and fails to take effect, the brakes may then, either manually or automatically, be applied by pneumatic control. Such a combined electrically and pneumatically controlled train brake equipment is necessarily elaborate in character and rather costly, and while practicable and justifiable in many cases for passenger trains is as yet unjustifiable for freight trains.

It will accordingly be seen that there is a definite field for the development of fluid pressure operated brake systems providing for greatly increased speed of propagation of pressure reduction or pressure increase impulses in the brake pipe in order to secure more nearly simultaneous application and release of the brakes on the cars of a long train and approaching even nearer that provided by electrical control. Such train brake equipments are preferably of the fluid pressure automatic type so as to inherently possess the safety of the fluid pressure operated type of brake equipment while approaching the desired more nearly simultaneous application of the brakes on the cars.

My invention contemplates the provision of valve devices located at opposite ends of each car and adapted for simultaneous operation by means of a mechanical element in the form of a cable, the valve devices at the rear end of one car and the head end of a successive car being mechanically coupled so that when the valve device at the head end of the first car is operated the valve devices on the cars to the rear are substantially simultaneously operated by mechanical means. The valve devices on the cars are adapted to control the pressure in the brake pipe so as to effect operation of the usual brake controlling valve devices on the cars to effect operation and release of the brakes. Since the valve devices on the cars are operated independently of the transmission or propagation of a pressure reduction or pressure increase wave through the brake pipe, the malicious or accidental closure of an angle cock in the brake pipe is ineffective to prevent the application of the brakes as is the case in conventional fluid pressure operated brake systems.

It is accordingly an object of my invention to provide a train brake equipment of the pneumatically controlled type wherein the propagation of a brake application impulse serially through the train is accelerated.

More specifically it is an object of my invention to provide a train brake equipment of the pneumatically controlled type wherein the propagation of brake application impulses serially through the train is effected by mechanical means independently of pressure reduction in the brake pipe initiated by the usual brake valve at the head end of the train.

Another object of my invention is to provide means whereby existing conventional train brake equipment of the pneumatically controlled type may be converted or modified in a manner to obtain heretofore unattained velocity of propagation of brake application impulses.

A further object of my invention is to provide a train brake equipment, of the character indicated in the foregoing objects, which is adapted to insure application of the brakes notwithstanding a maliciously or accidentally closed angle cock in the brake pipe and independently of the pressure gradient in the brake pipe.

The above objects, and other objects of my invention which will be made apparent hereinafter, are attained by means of an illustrative embodiment of my invention subsequently to be described and shown in the accompanying drawings wherein, Fig. 1 is a diagrammatic view showing a train brake equipment embodying my invention, Fig. 2 is a plan view, partly in section, of the automatic brake valve shown in Fig. 1, Fig. 3 is a plan view of the special brake valve shown in Fig. 1 and provided according to my invention.

Figs. 4, 5 and 6 are fragmental enlarged sectional views of the special brake valve shown in Fig. 1 indicating the connections established thereby in the release, service, and emergency positions, respectively, of the operating handle thereof, Fig. 7 is an enlarged sectional view taken on the line 7—7 of Fig. 1, showing the details of construction of the so-called actuator device, Fig. 8 is a fragmental plan view showing the coordination and cooperative relation of the two operating valve mechanisms at opposite ends of a car, Fig. 9 is an enlarged sectional view taken on the line 9—9 of Fig. 1 and Fig. 10 showing details of construction of the operating valve mechanisms on the cars, Fig. 10 is a sectional view, taken on the line 10—10 of Fig. 9, Fig. 11 is an enlarged vertical sectional view of the vent valve devices shown in Fig. 1, and Fig. 12 is an enlarged fragmentary plan view showing the relation of the operating arms disposed on successive cars beneath the car couplers as shown in Fig. 1.

DESCRIPTION OF EQUIPMENT

Referring to Fig. 1, the brake equipment shown is that for the locomotive, locomotive tender, the first car following the locomotive tender, and the head end of the second car following the locomotive tender.

Briefly the equipment on the locomotive comprises a main reservoir 11, a so-called feed valve pipe 12 containing a feed valve 13 of conventional type for regulating the pressure supplied from the main reservoir into the feed valve pipe to a certain pressure lower than that carried in the main reservoir, an automatic brake valve 14 which is substantially of conventional type except as modified according to my invention in the manner to be hereinafter pointed out, a brake pipe 15 which extends throughout all of the cars of the train, the sections thereof on the various cars being connected in the usual manner by flexible hose couplings 16 and associated angle cocks 16a, and a branch pipe 17 of the brake pipe which leads to the conventional distributing valve (not shown) on the locomotive which controls the application and release of the locomotive brakes.

According to my invention, the equipment on the locomotive further comprises a so-called special brake valve 18 and a timing reservoir 19 the purpose of which will be made apparent hereinafter.

The equipment carried on the locomotive tender includes a so-called actuator 21 for effecting rotation of an operating rod 22 that is suspended from the lower side of a portion of the car coupler 23 joining the locomotive tender and the first car by means of a bracket 24.

The car brake equipment includes a brake controlling valve device 25 illustrated as the Westinghouse "AB" valve, which is described in detail and claimed in Patent No. 2,031,213 to Clyde C. Farmer for controlling the supply of fluid under pressure to a brake cylinder 26 from an auxiliary reservoir 27 and an emergency reservoir 28. The brake controlling valve device 25 is connected to brake pipe 15 by a branch pipe 29 and is thus controlled in the usual manner by variations of pressure in the brake pipe.

According to my invention, the car brake equipment further includes two operating valve devices 31, one of which is located at the head or front end and the other of which is located at the rear end of the car. The two valve devices 31 at opposite ends of the car are operatively associated by means of a cable 110, see Fig. 8, contained within a suitable conduit or pipe 32 in which is interposed a vent valve device 33 operated by movement of the cable in the pipe 32. When operated, the vent valve 33 effects a reduction of the pressure in the quick action chamber 34 of the brake controlling valve device 25 through a branch pipe 35, for a purpose to be hereinafter made apparent.

The operating valve device 31 at the head end of the first car following the locomotive tender is operated by an operating rod 22a which is suspended from the lower side of the portion of the car coupler 23 carried on the car in such manner as to cooperate with the operating rod 22 at the rear of the locomotive tender. As shown in Figs. 1 and 12, the rods 22 and 22a have end arms which assume cooperating positions upon coupling of the cars and are so related that rotation of rod 22 produces rotation of rod 22a and vice versa. The operating device 31 at the head end of the car is operated by rotation of the operating rod 22a and in turn, in the manner to be presently described, effects operation of the operating valve device 31 at the rear of the car. Operation of the latter valve device in turn effects rotation of an operating rod 22a which is supported from the portion of the car coupler at the rear of the car in the same manner in which the rod 22a is supported from its associated car coupler at the head end of the car.

The equipment on each succeeding car behind the first car duplicates that shown in Fig. 1 and is thus not shown, only the operating valve device 31 and its associated operating rod 22a at the head end of the second car being shown.

The operating valve devices 31 on the cars are connected to the brake pipe 15 through branch pipe 37, the arrangement of the operating valve devices 31 being such that only the operating valve device 31 at the rear of the car is effective to reduce brake pipe pressure, it being understood that the operating device 31 at either end may effect reduction in brake pipe pressure depending upon whether it is at the head end of the car or at the rear end.

Considering the parts of the equipment in greater detail, the automatic brake valve device 14 is of the conventional type including an operating handle 41 having the usual operating positions of release, running, lap, service, and emergency as shown in Fig. 2, and is modified according to my invention by the addition of an operating cylinder 42 suitably mounted on the casing of the brake valve by a supporting bracket or strut 43. The cylinder 42 contains a piston 44 having a stem 45 which projects out of the end of the cylinder and is adapted to engage an arm 46 fixed to the operating shaft for the rotary valve (not shown) of the automatic brake valve 14. Interposed between the end of the cylinder 42 and the piston 44 is a coil spring 47 which normally biases the piston 44 into contact with an end cover 48 at the opposite end of the cylinder. In this position of the piston 44, the end of the stem 45 is spaced from the arm 46 when the brake valve handle 41 is in its normal running position, as shown in Fig. 2.

When fluid under pressure is supplied through a pipe 49 to the chamber 51 at the side of the piston opposite the spring 47, and sufficient pressure is developed in the chamber 51, the piston 44 moves outwardly against the force of the spring 47 to effect engagement of the end of the stem 45 with the arm 46. The cylinder 42 is formed with a shoulder 53 therein which is engaged by the piston 44 and limits the outward movement of the piston. When the piston 44 engages the shoulder 53, the arm 46 is rotated to such a degree that the operating handle 41 of the brake valve is in lap position.

With the operating handle 41 of the automatic brake valve 14 in release position, fluid under pressure is supplied from the main reservoir 11 to the brake pipe 15 under the control of the automatic brake valve 14 in by-passing relation to the feed valve device 13 in the usual manner as described in Instruction Pamphlet 5032 (November 1932) published by The Westinghouse Air Brake Company. In this position of the brake valve handle the increase of pressure in the brake pipe 15 is effective to cause operation of the brake controlling valve devices 25 on the cars to effect release of the brakes on the cars without effecting operation of the distributing valve device on the locomotive to effect release of the locomotive brakes.

With the operating handle 41 of the automatic brake valve 14 in running position, the brake pipe 15 is charged under the control of the brake valve 14 by fluid under pressure supplied from the feed valve pipe 12, the rotary valve of the brake valve 14 being in position to effect the operation of the distributing valve on the locomotive to effect release of the locomotive brakes.

With the handle 41 of the automatic brake valve 14 in lap position, the rotary valve of the automatic brake valve 14 is positioned so as to close off or lap the supply of fluid under pressure from the main reservoir or from the feed valve pipe 12 to the brake pipe 15 so as to prevent the influx of fluid under pressure into the brake pipe at the locomotive end upon reduction of the pressure in the brake pipe on the cars in the manner to be hereinafter described.

With the handle 41 of the automatic brake valve 14 in service position, the rotary valve of the brake valve is positioned to effect a reduction of the pressure in the brake pipe 15 at a service rate in the usual manner; and with the handle 41 in emergency position, the rotary valve is in position to effect a reduction of brake pipe pressure at an emergency rate in the usual manner.

It will be understood that only so much of a conventional locomotive brake equipment as is necessary to an understanding of my present invention is shown. The other elements are omitted for simplicity but it is intended that they be included in the complete brake equipment.

Referring to Figs. 3, 4, 5 and 6, the special brake valve device 18 comprises a suitable casing having therein a chamber 55 in which is contained a slide valve 56 that operates on a cooperating valve seat 57. The slide valve 56 is operated to different positions by rotation of an operating handle 58 through an operating stem 59 and a pinion gear 61 secured to the stem 59 and meshing with a gear rack 62 attached to or formed on the slide valve 56.

The operating handle 58 has three operating positions, namely release, service, and emergency, and is provided with a conventional spring-biased pawl for engaging in suitable notches in a quadrant plate 63 for yieldably holding the handle in the various operating positions.

The chamber 55 of the special brake valve 18 is constantly connected to the feed valve pipe 12 by a branch pipe 64 so that the chamber 55 is constantly charged with fluid to a pressure as regulated by the feed valve device 13.

The pipe 49 is connected to a passage 49 which opens at the valve seat 57 of the special brake valve 18 and, with the handle 58 of the special valve in release position, the slide valve 56 is positioned to connect the passage 49 to an atmospheric exhaust port and passage 65 through a cavity 66 formed in the slide valve 56, as shown in Fig. 4.

The slide valve 56 also contains two service ports 67 and 68 which are effective, when the operating handle 58 is in service position, to connect the chamber 55 to the passage and pipe 49 and a passage and pipe 69, respectively. The passage and pipe 69 lead to the actuator 21 and thus, when the slide valve 56 is in service position, fluid at feed valve pressure is supplied at a service rate through the ports 67 and 68 to the cylinder 42 and the actuator 21. The volume reservoir 19 is connected to the pipe 49 and thus serves to delay the build-up of pressure in the chamber 51 of the cylinder 42 for a purpose which will be hereinafter made clear. As will be apparent in Fig. 5, with the slide valve 56 in service position, the cavity 66 is shifted to disconnect the passage and pipe 49 from the atmosphere exhaust passage 65.

The slide valve 56 is also provided with an emergency port 71 which is effective when the slide valve 56 is positioned in emergency position in response to operation of the handle 58 to emergency position, to connect the chamber 55 of the brake valve 18 to the passage and pipe 49. At the same time, the passage and pipe 69 is uncovered at the end of the slide valve 56 and, therefore, fluid at feed valve pressure is supplied at an emergency rate into the pipes 49 and 69. Since the emergency port 71 is of larger flow area than the service port 67, the build-up of pressure in the chamber 51 of the cylinder 42 is not delayed as long as with the slide valve 56 in service position.

Referring to Fig. 7, the actuator 21 comprises a cylinder 75 and a flange 76 for securing the cylinder 75 to a fixed part 77 of the car body (see Fig. 1). Operative in a bore 73 in the cylinder 75 is a piston 78 having a stem 79 which is slidably supported in another bore 90. Interposed between one end of the cylinder 75 and the end of the stem 79 in bore 90 is a coil spring 81 which yieldingly urges the stem and piston 78 in the left-hand direction to a position wherein a projection 82 on the piston engages an end cover 83 at the outer end of the bore 73.

Formed between the piston 78 and the end cover 83 is a chamber 84, hereinafter called the piston chamber, to which the pipe and passage 69 leading from the brake valve 18 is constantly connected. The end cover 83 contains a restricted port 85 through which fluid under pressure supplied to the piston chamber 84 may leak to atmosphere at a restricted rate for a purpose to be hereinafter made clear.

When the pressure of the fluid supplied to the piston chamber 84 increases sufficiently to overcome the resisting force of the spring 81, the piston 78 moves in the right-hand direction until it engages the free end of a coil spring 86 which concentrically surrounds the stem 79 and has its opposite end supported against an annular shoulder 87 that forms a circular opening 88 through which the stem 79 extends. The movement of the piston 78 in the right-hand direction, after engagement with the spring 86 occurs, is opposed by the force of the two springs 81 and 86, and thus a substantial additional increase in the pressure of the fluid supplied to the piston chamber 84 is required to move the piston 78 further in the right-hand direction.

When the pressure of the fluid supplied to the piston chamber 84 increases sufficiently to overcome both the springs 81 and 86, the piston 78 is shifted in the right-hand direction until the end of the stem 79 engages a stop on the casing, illustrated in the form of a rod 89 formed on or attached to the cylinder 75 within the bore 90 in coaxial relation to the stem 79.

The two bores 73 and 90 of the cylinder are constantly open to atmosphere through suitable ports to prevent dash-pot action of the piston and piston stem therein.

The flange 76 of the actuator 21 is provided with a circular opening 91 in which is contained a sleeve or bushing 92 that is adapted to be rotarily shifted in the opening 91 by movement of the piston 78. As illustrated, the bushing 92 has a radially projecting arm 93 which extends through a suitable slot 94 and is provided at the end thereof with a yoke for straddling a flat portion 96 of the stem 79. The arms of the yoke are circular in contour and are closely confined between spaced shoulders 97 formed at the opposite ends of the flat portion 96 of the stem 79.

The sleeve 92 is provided with an irregular opening 99, illustrated as of square shape, in which is slidably received a correspondingly shaped portion of the operating rod 22 previously referred to (see Fig. 1). As previously mentioned, the operating rod 22 is rotatably supported by means of a bracket 24 secured to the lower side of a corresponding portion of the car coupler 23 and the end portion of the operating rod 22 having the irregular shape is of sufficient length to accommodate the axial movement of the rod 22 due to movement of the portion of the car coupler by which it is supported.

When fluid under pressure is supplied through the pipe 69 to the piston chamber 84 at a service rate, sufficient pressure is developed in the piston chamber 84 to shift the piston 78 against the resisting force of the spring 81 into engagement with the spring 86. However, due to the leakage of fluid under pressure from the piston chamber 84 through the restricted port 85, insufficient pressure is developed in the piston chamber to overcome the combined resisting force of the springs 81 and 86. Thus, when fluid under pressure is supplied to the piston chamber 84 at a service rate, the sleeve 92 and the operating rod 22 are rotarily shifted through an angle corresponding to the movement of the piston 78.

When fluid under pressure is supplied to the piston chamber 84 at an emergency rate, the restricted port 85 is ineffective to prevent the build-up of pressure in the piston chamber 84 to a degree sufficient to overcome the resisting force of both the springs 81 and 86 and the piston 78 is shifted accordingly to the fullest extent, that is, until the stem 79 engages the stop 89. The sleeve element 92 and the operating rod 22 are correspondingly rotated through a certain angle greater than that in the previous case.

It will thus be seen that when the operating handle of the special brake valve 18 is shifted to service position, the operating rod 22 is rotated through a corresponding angle and that when the operating handle of the brake valve 18 is shifted to emergency position the operating rod 22 is rotated through a greater angle.

Referring to Figs. 9 and 10, each of the operating valve devices 31 comprises a casing in which is formed a chamber 101 through which a bushing 102 rotatably mounted in the casing extends. The bushing 102 has a longitudinal passage 103 therein through which an operating rod 22a previously referred to extends. A flange 104 formed on the bushing and extending into the passage 103 has an opening 105 therein of irregular shape and the rod 22a is conformingly shaped along a portion of the length thereof so as to be slidably received in the opening 105 and thereby interlocked with the bushing 102. Thus if the operating rod 22a is rotated through an angle, the bushing 102 is correspondingly rotated; and if the bushing 102 is rotated through an angle, the operating arm 22a is correspondingly rotated.

Rotatably mounted on the bushing 102 within the chamber 101 is a ring 108 which has a radially projecting arm 109. One end of a cable 110 is secured to the outer end of the arm 109 and passes over a suitable supporting pulley 111 suitably mounted within the chamber 101 and through the pipe 32 leading to the operating valve device 31 at the opposite end of the car where the opposite end of the cable is connected in a similar manner to the outer end of a corresponding arm 109, as indicated in Fig. 8.

A torsion spring 112 is provided for holding the bushing 102 in a normal position and yieldingly resisting rotation of the bushing in either direction out of the normal position, one end of the torsion spring being secured to the casing and the other end to the bushing (see Fig. 10).

Formed on the bushing 102 and projecting into the chamber 101 is a lug 114 which is adapted to engage a lug 115 formed on the arm 109 upon rotation of the bushing 102 in a counterclockwise direction as viewed in Fig. 9. It will thus be seen that if the operating rod 22a is rotated in a counterclockwise direction as viewed in Fig. 9, the arm 109 on the ring 108 is shifted in a counterclockwise direction to exert a pull on the cable 110.

When the cable 110 of an operating valve device 31 is pulled in the right-hand direction as viewed in Fig. 9, due to the pull exerted thereon in the manner just described by an operating device 31 at the opposite end of the car, the arm 109 of the ring 108 is shifted in a clockwise direction a degree corresponding to the degree to which the arm 109 of the operating valve device 31 at the opposite end of the car is shifted.

The movement of the operating arm 109 in a clockwise direction is effective to unseat in succession a so-called service valve 117 and a so-called emergency valve 118. The emergency valve 118 is contained in a chamber 119 in the casing which is constantly connected to brake pipe 15 through a branch pipe and passage 37. A coil spring 120 contained in the chamber 119 and interposed between the casing and a flange on the emergency valve yieldingly urges the emergency valve normally into seated relation on an associated valve seat to close communication past the emergency valve from the chamber 119 to a passage 122 leading to a piston chamber 123.

The service valve 117 is of the poppet type and is contained within a chamber 124 formed in the emergency valve 118 and constantly open to the chamber 119 through a restricted port 125. Service valve 117 is normally yieldingly urged into seated relation on an associated valve seat formed on the emergency valve 118 by a coil spring 126.

The emergency valve 118 has a stem 128 which projects into the chamber 101 in alignment with and in the path of movement of the arm 109 of the ring 108. The service valve 117 has a stem 127 which telescopes within the stem 128 of the emergency valve 118 and projects beyond the end of stem 128 into engagement with the arm 109.

When the ring 108 and arm 109 are shifted in a clockwise direction, as seen in Fig. 9, through an angle corresponding to operation of the handle 58 of the brake valve 18 to service position, the arm 109 shifts the stem 127 of the service valve 117 and unseats the valve so that fluid under pressure then flows from the branch pipe 37 and brake pipe 15 to the piston chamber 123 at a restricted rate controlled by the size of the restricted port 125. The end of the stem 128 of the emergency valve is so spaced from the arm 109 that the angle of movement of the arm 109 for operation of the handle 58 of the brake valve 18 to service position is insufficient to engage the stem 128 and unseat the emergency valve 118. However, when the arm 109 is shifted through an angle corresponding to and resulting from the operation of the handle 58 of the brake valve to emergency position, the arm 109 first unseats the service valve 117 and then engages the stem 128 and unseats the emergency valve 118. Accordingly, when the emergency valve 118 is unseated, fluid under pressure is supplied at a rapid rate from the brake pipe 15 and branch pipe 37 to the piston chamber 123 in by-pass relation to the restricted port 125.

Operating in a suitable bore 131 in the casing and subject on one side to the pressure of fluid supplied to the piston chamber 123 is a piston 132 having a stem 133 which is suitably guided in the casing and open along a portion of the length thereof to the chamber 101. The bushing 102 has a radially projecting arm 134 the end of which is formed as a yoke which straddles a flat portion 135 of the stem 133. The yoke arms are circular in form and are closely confined between spaced shoulders 135a formed at the opposite ends of the flat portion 135 on the stem 133.

Extending longitudinally through the stem 133 of the piston 132 is a passage 136 which opens at one end into the piston chamber 123 through a restricted port 137, and, at the opposite end adjacent the end of stem 133, into the chamber 101 through a plurality of ports 138.

Contained in a chamber 141 which is constantly connected to the chamber 119 by way of a passage 142 and passage 37 is an emergency vent valve 143, illustrated as of the disc type. The valve 143 has a stem 144 which is slidably supported on one side of the valve in a boss 145 on the casing and on the opposite side of the valve in a counterbored portion at the outer end of the passage 136 in the stem 133 of the piston 132. Formed in the passage 136 at the inner end of the enlarged counterbored end portion thereof is a conical valve seat 146 on which a pin valve 147 formed at the end of the stem 144 is adapted to seat when the piston 132 and its stem 133 are shifted in the left-hand direction, as viewed in Fig. 9.

When the pin valve 147 is unseated from its associated valve seat 146, fluid under pressure supplied to the piston chamber 123 may flow at a rate determined by the restricted port 137 into the passage 136 and thence out through the ports 138 into the chamber 101 which is constantly open to atmosphere, as presently described.

When the pin valve 147 is seated on its associated seat 146, it closes the end of the passage 136 and thus prevents the flow of fluid under pressure from piston chamber 123 through the passage 136 and the ports 138 to the chamber 101. The purpose of this feature will be made apparent hereinafter.

The vent valve 143 is normally yieldingly urged into seated relation on an associated annular rib seat 148 by a coil spring 149, interposed between the valve and the casing, within the chamber 141. The valve 143 is unseated from its associated valve seat 148 by shifting of the piston 132 and its stem 133 in the left-hand direction, after the stem 133 moves sufficiently in the left-hand direction to seat the pin valve 147 on its associated valve seat 146.

When the vent valve 143 is unseated, the chamber 141 is open directly to an atmospheric chamber 151 through a large passage 152, the chamber 151 being open to atmosphere through a relatively large port 153 and the chamber 101 opening into the chamber 151 through a relatively large port 154. It will thus be seen that since the chamber 141 is connected to the brake pipe 15 by way of the passage 142 and passage and pipe 37, the unseating of the vent valve 143 effects a rapid or emergency reduction of brake pipe pressure.

Contained in a chamber 155 on the side of the piston 132 opposite the piston chamber 123 is a coil spring 156 which concentrically surrounds the stem 133 of the piston and is arranged so that one end of the spring engages an annular shoulder 157 formed on the casing and surrounding the stem 133. The spring 156 is of such length that the piston 132 must move a predetermined distance in the left-hand direction before engaging the free end of the spring. The chamber 155 is constantly open to atmosphere through a port 158 to prevent dash-pot action of the piston upon movement in the left-hand direction.

When the arm 109 is moved in a clockwise direction only far enough to unseat the service valve 117, fluid under pressure is supplied to the piston chamber 123 at the restricted rate governed by the size of the restricted port 125. The fluid pressure accordingly builds up in the piston chamber 123 and shifts the piston 132 in the left-hand direction against the resistance of the torque spring 112. The rate of release of fluid under pressure from the piston chamber 123 through the restricted port 137, passage 136 and ports 138 is sufficient, however, to prevent the build-up of sufficient pressure to overcome the resistance of the spring 156 and thus, when only the service valve 117 is unseated, the piston 132 is shifted in the left-hand direction into engagement with the spring 156 which prevents further movement of the piston and stem 133 in the left-hand direction. The length of the spring 156 is such as to prevent the seating of the pin valve 147 on its associated valve seat 146 and accordingly, as long as the fluid pressure in the chamber 123 is insufficient to overcome the spring 156, the passage 136 remains connected through the ports 138 to the chamber 101 and thus to atmosphere.

If the arm 109 on the ring 108 is shifted through a sufficient angle in a clockwise direction, as seen in Fig. 9, to effect unseating of the emergency valve 118, fluid under pressure is supplied from the brake pipe 15 to the piston chamber 123 at a rapid or emergency rate so that when the piston 132 engages the spring 156 the flow of fluid under pressure out of the piston chamber 123 through the restricted port 137 and passage 136 is insufficient to prevent further increase of pressure in the piston chamber. Accordingly, the pressure increases further and thus becomes effective to overcome the force of the spring 156 so that the piston 132 is shifted to a further extent in the left-hand direction until it engages a stop shoulder 162 formed in the chamber 155. Such movement of the piston 132 is sufficient, however, to seat the pin valve 147 on its associated valve seat 146 and unseat the vent valve 143. Thus the flow of fluid under pressure from the piston chamber 123 through the passage 136 to atmosphere is closed off and the vent valve 143 is unseated to effect an emergency reduction of brake pipe pressure.

Referring to Fig. 11, each vent valve device 33 comprises a suitable casing in which is formed a chamber 165 constantly open to atmosphere through a large port 166. The cable 110 connecting the operating valve devices 31 at the head and rear ends of a car is adapted to extend through the chamber 165 and has secured thereon in spaced relation within the chamber two collars 167.

A lever 168 contained in the chamber 165 is pivoted intermediate its ends, as on a pin 169, and is formed at its upper end as a yoke which straddles the cable 110 at a point between the collars 167 so that the lever 168 is rocked on the pin 169 in response to the movement of the cable 110 in either the right-hand or left-hand direction. The opposite end of the lever 168 extends between the spaced ends of the stems of two oppositely facing poppet valves 171 and 172. The valves 171 and 172 are contained respectively in chambers 173 and 174 which are mutually connected by a passage 175; and the pipe and passage 35 leading from the brake controlling valve device 25 is connected to passage 175 through a restricted port 176.

Normally, the valves 171 and 172 are urged into seated relation on associated valve seats by associated coil springs 177 and 178, respectively. When seated, the valves 171 and 172 close communication from chambers 173 and 174, respectively, to the chamber 165. When unseated, the valve 171 opens communication therepast from the chamber 173 to a passage and port 179 opening into the chamber 165. In a similar manner when the valve 172 is unseated it opens communication from the chamber 174 to a passage and port 181 opening into the chamber 165.

It will be apparent that the rocking of lever 168 in a clockwise direction unseats valve 171 and that the rocking of lever 168 in a counter-clockwise direction unseats valve 172. Thus, when cable 110 is pulled in either the right-hand or left-hand direction, as seen in Fig. 11, the pipe 35 and quick-action chamber 34 of brake controlling valve device 25 are vented to atmosphere. The purpose of this feature will be explained hereinafter.

For the purpose of understanding my invention, it is believed unnecessary to describe the structure and operation of the brake controlling valve device 25 in detail. However, if such description and operation is desired, reference may be had to Patent 2,031,213 previously mentioned.

Briefly, the brake controlling valve device 25 comprises a casing embodying a service portion 185 and an emergency portion 186. The pressure in the brake pipe 15 is communicated to a piston chamber in the brake controlling valve device 25 through the branch pipe 29, the service and emergency portions of the valve device each having an operating piston subject to the pressure in the piston chamber and controlled by variations of the pressure therein.

The operating piston of the emergency portion 186 is subject on the side opposite the piston chamber to the pressure of fluid in the quick action chamber 34 which is charged with fluid under pressure from the brake pipe 15 through a feed groove around the piston in the normal release position of the piston. When the pressure in the brake pipe 15 and consequently in the piston chamber of the brake controlling valve device 25 is reduced at a service rate, the operating piston of the service portion 185 of the valve device 25 is shifted in response thereto to establish communication through which fluid under pressure is supplied from the auxiliary reservoir 27 to the brake cylinder 26. At the same time, the operating piston of the emergency portion 186 tends to effect operation of the emergency portion due to the reduction of the pressure in the piston chamber but the initial movement of the emergency piston is effective to establish a venting communication for the quick action chamber 34 which causes the pressure in the quick action chamber 34 to be reduced at substantially the same rate as the pressure in the piston chamber is reduced. Consequently, the emergency piston moves only a slight amount which is insufficient to cause an emergency application of the brakes.

When the brake pipe pressure is reduced at an emergency rate, the rate of venting of the quick action chamber 34 is insufficient to prevent the operation of the emergency piston and, accordingly, both the service and emergency pistons are operated to cause communication to be established for supplying fluid under pressure simultaneously from the auxiliary reservoir 27 and the emergency reservoir 28 to the brake cylinder 26.

It will be understood that when the brake pipe pressure is reduced at a service rate, the service portion 185 of the brake controlling valve device 25 operates in a manner similar to the conventional triple valve device to establish a pressure in the brake cylinder 26 corresponding substantially to the amount of the reduction of the pressure in the brake pipe.

The brake controlling valve device 25 is designed to effect the reduction of the pressure in the quick action chamber 34 to prevent undesired operation of the emergency piston during a service application only as long as the rate of reduction in brake pipe pressure does not exceed the maximum rate of reduction of brake pipe pressure during the service application. Due to the employment of the operating valve devices 31 and the reduction of pressure in the brake pipe 15 effected thereby in the manner hereinafter to be described, the brake controlling valve devices 25 are ineffective in themselves to reduce the pressure in the quick action chamber 34 thereof at a sufficiently rapid rate to prevent the undesired operation of the emergency portion 186 in a service application. The vent valve devices 33 are accordingly provided in order to effect an additional reduction of the pressure in the quick action chamber 34 so as to increase the rate of reduction thereof during a service application of the brakes sufficiently to prevent undesired operation of the emergency portion 186. The increase in the rate of reduction of the quick action chamber pressure effected by the vent valve device 33 is not sufficient however to prevent the intended operation of the emergency portion 186 of the brake controlling valve devices 25 in response to a reduction of the pressure in the brake pipe 15 at an emergency rate.

OPERATION OF EQUIPMENT (a) *Charging*

Assuming that the main reservoir 11 is charged to the normal pressure carried therein in the usual manner from a fluid compressor not shown and that the handle 41 of the automatic brake valve 14 is in its normal or running position, the brake pipe 15 is charged with fluid at a pressure regulated by the feed valve 13. At the same time, with the handle 58 of the special brake valve 18 in release position, fluid at a pressure regulated by the feed valve 13 is supplied to the valve chamber 55 of the special brake valve 18 through the branch pipe 64 from the feed valve pipe 12. Accordingly, pipe 69 and connected piston chamber 84 of the actuator 21 is vented to atmosphere through the restricted port 85 of the actuator; also the pipe 49 and connected piston chamber 51 of the actuating cylinder 42 associated with the automatic brake valve 14 are vented to atmosphere through the exhaust port and passage 65 of the special brake valve 18. The piston 78 of the actuator 21 and piston 44 of the cylinder 42 are accordingly positioned as shown in Figs. 2 and 7, respectively.

With the actuator 21 conditioned as shown in Fig. 7, the operating valve devices 31 and the vent valve devices 33 on the cars are correspondingly conditioned as shown in Figs. 9 and 11 respectively.

With the brake pipe 15 charged to the normal feed valve pressure, the distributing or brake controlling valve connected to the branch pipe 17 on the locomotive and the brake controlling valve devices 25 on the cars are correspondingly conditioned in response to the brake pipe pressure to effect the release of fluid under pressure from the brake cylinders on the locomotive and the brake cylinders 26 on the cars so that the brakes on the train are released.

(b) *Service application of the brakes*

Let it be assumed that the train is traveling along the road under power or coasting with the brake equipment conditioned as just described, that is with the brakes released, and that the operator desires to effect a service application of the brakes by means of the special brake valve 18. In such case, the operator first cuts off the propulsion power, if the power is on, and then shifts the handle 58 of the special brake valve 18 to service position, holds it in service position long enough to obtain the desired degree of service application, and then returns it to release position.

With the handle 58 of the special brake valve 18 in service position, the slide valve 56 of the brake valve is positioned as shown in Fig. 5 and accordingly fluid under pressure is supplied at feed valve pressure into the pipes 49 and 69 leading to the actuating cylinder 42 of the automatic brake valve 14 and to the actuator 21 respectively. The timing reservoir 19 and the flow area of the port 67 in the slide valve 56 of the special brake valve 18 are so designed as to delay the build-up of pressure in the piston chamber 51 of the actuating cylinder 42 for the automatic brake valve 14 a sufficient time to insure the propagation of the application impulse to the rear end of the train before attaining a pressure sufficient to shift the piston 44 outwardly to cause movement of the handle 41 of the automatic brake valve 14 to lap position.

Accordingly, fluid under pressure continues to be supplied into the brake pipe 15 under the control of the automatic brake valve 14 until the handle 41 is shifted to lap position, at which time further charging of the brake pipe is cut off.

The purpose of this feature is to insure a more nearly simultaneous application of the brakes throughout the length of the train. It will be apparent that by continuing to feed fluid under pressure into the brake pipe 15 at the head end of the train, the application of the brakes on the head end of the train is inhibited or held back until such time as the handle 41 of the automatic brake valve 14 is automatically shifted to lap position by the cylinder 42, which delay time is sufficient to enable the initiation of application of the brakes at the rear end of the train.

It will be understood from subsequent description of the operation of the equipment that the propagation of an application impulse from the head to the rear of the train occurs in a very short interval of time. For example, in a very long train of one hundred and fifty cars, the propagation time of an application impulse from the head to the rear of the train may be of the order of one or two seconds. Thus, it will be understood that objectionable slack action is unlikely and the delay in the application of the brakes on the head end of the train is merely for the purpose of approaching more closely to the desired simultaneous application of the brakes on all the cars.

Returning now to the actuator 21, the supply of fluid under pressure at a service rate to the piston chamber 84 of the actuator 21 causes shifting of the piston 78 in the right-hand direction, as seen in Fig. 7, into engagement with the end of the coil spring 86, further movement in the right-hand direction being prevented by the spring 86 in a service application of the brakes due to the effect of the restricted port 85 as previously explained.

The operating rod 22 of the actuator 21 is accordingly rotated to a degree corresponding to the degree of movement of the piston 78 in a counterclockwise direction as seen in Fig. 7 and as indicated by the circular arrows in Fig. 1.

The operating rod 22, which as previously explained is at the rear of the locomotive tender, engages the corresponding operating rod 22a at the head end of the first car following the locomotive tender and thus actuates it in the same direction, as indicated by the circular arrows in Fig. 1. Such rotation of the operating rod 22a for the operating valve device 31 at the head end of the car corresponds to a counterclockwise rotation of the operating rod 22a as seen in Fig. 9.

Upon counterclockwise rotation of the operating rod 22a and the consequent counterclockwise rotation of the arm 109 on the ring 108, a pull is exerted on the cable 110 which is instantly transmitted to the arm 109 of the operating valve device 31 at the rear of the first car. This produces a clockwise rotation of the arm 109 in the operating valve device 31 at the rear of the first car and the consequent unseating of the service valve 117. The operating valve device 31 is thus effective in the manner previously described to effect a reduction of the pressure in the brake pipe by flow of fluid under pressure through the branch pipe 37, chamber 119, restricted port 125, chamber 124, past the unseated service valve 117 and passage 122 to the piston chamber 123. Accordingly, piston 132 is shifted in the left-hand direction, as viewed in Fig. 9, into engagement with the end of the coil spring 156, further movement of the piston being prevented, as previously explained, due to the release of fluid under pressure from the piston chamber 123 through the exhaust passage 136.

Thus, due in part to the engagement of the lug 115 on the arm 109 with the lug 114 on the bushing 102 when the arm 109 is shifted in a clockwise direction by the pull on the cable 110 and finally in response to the shifting of the piston 132 in the left-hand direction, the bushing 102 is rotated in a clockwise direction, as seen in Fig. 9, which corresponds to a counterclockwise direction when viewed looking toward the rear end of the first car, as indicated by the circular arrows in Fig. 1. Rotation of the operating rod 22a of the operating valve 31 at the rear of the first car effects corresponding rotation of the operating rod 22a on the head end of the second car, as indicated by the circular arrows in Fig. 1. Such rotation of the operating rod 22a of the operating valve 31 on the head of the second car produces a pull on cable 110 leading to the operating valve device (not shown) at the rear end of the second car, in the manner previously described for a pull on the cable 110 on the first car and, accordingly, the operating valve device 31 at the rear end of the second car is operated to effect a reduction of the pressure in the brake pipe at a service rate and rotation of the operating rod 22a associated therewith.

It will thus be seen the operation continues serially on through successive cars toward the rear end of the train.

Since the two operating valve devices 31 at opposite ends of each car are connected by a cable 110 and operate at identically the same instant, it will be seen that the length of time required to transmit an application impulse from the locomotive to the last car of a very long train, such as a one hundred and fifty car train will be very short, possibly one or two seconds. As previously pointed out, the reduction of fluid pressure in the section of the brake pipe 15 at the head end of the train is delayed for a slight interval of time due to the delay in the shifting of the handle 41 of the automatic brake valve 14 to lap position. Assuming then that an application impulse has been propagated from the head to the rear or last car on the train as just described and that the brake valve handle 41 has been shifted to lap position, the reduction of the pressure in the brake pipe 15 at a service rate effects operation of the brake controlling valve on the locomotive and the brake controlling valves 25 on the cars to effect a service application of the brakes substantially simultaneously on the locomotive and all the cars of the train.

As previously explained in connection with the description of the brake controlling valve device 25, the emergency portion 186 is operative to reduce the pressure in the quick action chamber 34 of the brake controlling valve device in order to prevent undesired operation of the emergency portion to effect an emergency application of the brakes when only a service application of the brakes is intended. In view of the fact that the operating valve device 31 at the rear of each car effects a reduction in brake pipe pressure at a corresponding point in the brake pipe, it will be understood that the rate of reduction in brake pipe pressure for a service application of the brakes will be faster than in the conventional AB brake equipment. Therefore, the vent valve devices 33 when operated by shifting of the cables 110 on the cars, effect an added reduction of the pressure in the quick action chamber 34 of the associated brake controlling valve device 25 to prevent the undesired operation of the emergency portion thereof to effect an emergency application of the brakes.

As previously explained, the operator holds the handle 58 of the special brake valve 18 in service position long enough to secure the desired degree of service application and then returns it to release position. It will be apparent that as long as the handle 58 of the special brake valve 18 is held in service position, the piston 78 of the actuator 21 will be maintained in service position and consequently all of the operating valve devices 31 on the cars will be maintained in service position. Thus the operating valve device 31 at the rear of each car of the train will be effective to continue the reduction of brake pipe pressure at a service rate as long as the handle 58 of the brake valve 18 is held in service position. Accordingly, the operator may control the amount of the reduction in brake pipe pressure by varying the time during which the handle 58 of the brake valve 18 is held in service position.

It will be apparent that when the brake valve handle 58 is returned to the release position, the piston 78 of the actuator 21 is substantially immediately returned to its normal release position shown in Fig. 7 by the spring 81 and the torsion spring 112 associated with the operating valve 31 at the head end of the first car following the locomotive tender. The length of the pipe 69 between the special brake valve 18 and the actuator 21 is relatively short and, consequently, once the slide valve 56 of the brake valve 18 is shifted to lap the opening of the pipe and passage 69 at the seat 57 of the slide valve, fluid under pressure trapped in the pipe and in the piston chamber 84 is vented to atmosphere through the restricted port 85 almost instantaneously.

When the operating rod 22 of the actuator 21 is thus returned to its normal position, the operating rod 22a of all of the operating valve devices 31 on all of the cars are immediately returned to their normal positions by the action of the torsion spring 112 associated therewith. It will be seen that when the displacing force on the operating rod 22a of the operating valve device 31 at the head of the car is relieved, the torsion spring 112 associated therewith immediately returns the operating arm 109 thereof to its normal position thus instantaneously relieving or relaxing the pull on the associated cable 110. Immediately, therefore, the spring 126 seats the service valve 117 of each of the operating valve devices 31 at the rear of a car thereby immediately cutting off the reduction in brake pipe pressure effected thereby. With the supply of pressure from the brake pipe to the piston chamber 123 of the operating valve device 31 at the rear of each car cut off, the pressure in the piston chamber 123 is rapidly reduced and the piston 132 is returned back to its normal position by the force of the torsion spring 112 acting through the bushing 102. It will thus be seen that when the operating handle 58 of the special brake valve device 18 is returned to its release position, the reduction in brake pipe pressure is substantially immediately cut off or stopped and the valve devices 31 and 33 on the cars immediately returned to the normal condition thereof.

As is well known, the degree of a service application of the brakes depends upon the amount of the reduction in brake pipe pressure, the brake controlling valve devices 25 on the cars being automatically effective to establish a pressure in the brake cylinders 26 which corresponds to the amount of the reduction in brake pipe pressure. The operator may, therefore, effect any desired degree of service application or he may graduate the application increasingly as desired by successive operation of the brake valve handle 58 to service position and back to release position.

When the handle of the special brake valve 18 is returned to release position, fluid under pressure is vented from the piston chamber 51 of the actuating cylinder 42 of the automatic brake valve 14 and from the timing reservoir 19 to atmosphere through the exhaust port and passage 65 of the special brake valve 18. However the stem 45 of piston 44 merely retracts from the arm 46 secured to the operating shaft of the automatic brake valve 14 and thus the brake valve handle 41 continues to remain in lap position so that the supply of pressure from the feed valve pipe 12 to the brake pipe 15 remains cut off.

As is well known, in the case of the conventional fluid pressure brake equipment wherein the brakes are controlled solely by variations in brake pipe pressure, the closure of an angle cock, either maliciously or accidentally, causes failure of the brakes on the cars to the rear of the closed angle cock due to the fact that reduction of the pressure in the brake pipe behind the closed angle cock is prevented. Obviously, the unintended closure of an angle cock may result in serious damage, if not actual derailment and wreckage, of the cars due to the severity of the run-in of slack between the cars on which the brakes fail to apply.

My present brake equipment prevents such an occurrence because it effects application of the brakes, once the brake pipe is charged, independently of the condition of the angle cocks in the brake pipe. It will be seen that should the angle cock 16a at the head end of the first car be closed after the brake pipe is once charged, the operating valve devices 31 at the rear of each car nevertheless operate to reduce brake pipe pressure upon operation of the special brake valve 18 so that at least one application following closure of one or more of the angle cocks is insured.

Obviously, once the pressure in the brake pipe behind a closed angle cock is reduced it cannot thereafter be increased and restored to its normal pressure to effect release of the brakes unless the angle cock is opened. Thus if the operator of the train should endeavor to release the brakes and start the train, the drag of the brakes on the cars behind the closed angle cock will indicate to him the faulty condition and he may then take immediate steps to remedy the situation. My present brake equipment accordingly eliminates this possible cause of accident or damage to the cars of a train.

(c) *Release of the brakes following service application*

Let it now be supposed that, having effected a service application of the brakes in the manner just described and having thus brought the train to a stop, the operator desires to release the brakes prior to again starting the train. In such case, since the stem 45 of the piston 44 in the actuating cylinder 42 for the automatic brake valve 14 is retracted, the operator shifts the handle 41 of the automatic brake valve 14 back to running position. The brake pipe is thus again charged to the normal pressure carried therein as controlled by the feed valve 13 and the brake controlling valve device on the locomotive and the brake controlling valve devices 25 on the cars are correspondingly operated to effect a release of fluid under pressure from the brake cylinder 26 and consequent release of the brakes.

It will be apparent that if the operator desires to graduate off an application of the brakes while the train is in motion and approaching a stop, all that is required for him to do is to shift the handle 41 of the automatic brake valve 14 from lap position to running position to increase the pressure in the brake pipe 15 a desired amount and then return the handle 41 back to lap position. In such case, the brake controlling valve device on the locomotive and the brake controlling valve devices 25 on the cars operate to reduce the degree of application according to the amount the pressure in the brake pipe is increased.

(d) *Emergency application of the brakes*

Assuming that the handle 41 of the automatic brake valve 14 is in its normal running position and that the handle 58 of the special brake valve 18 is in its release position so that the brakes are released, the operator may effect an emergency application of the brakes by shifting the handle 58 of the special brake valve device 18 to emergency position. Accordingly, the slide valve 56 of the special brake valve 18 is positioned as shown in Fig. 6 and fluid at feed valve pressure is supplied at a rapid rate into the pipes 49 and 69.

Since fluid under pressure is supplied through pipe 49 to piston chamber 51 of the actuating cylinder 42 for the automatic brake valve 14 at a rapid rate, the actual time that the timing reservoir 19 delays the shifting of the operating handle 41 to lap position is less than in the case of the service application, being almost instantaneous.

As previously explained, when fluid under pressure is supplied at an emergency rate through the pipe 69 to the piston chamber 84 of the actuator 21, the piston 78 is rapidly shifted to its fullest extent in the right-hand direction to cause rotation of the operating rod 22 to its fullest extent. The operation of the operating valve devices 31 in sequence along the train to the last car on the train is effected in the same manner as previously described for a service application except that the angle through which each of the operating rods 22a for the operating valve devices 31 is shifted is greater than in the case of a service application and, accordingly, effects simultaneous unseating of the service valve 117 and emergency valve 118 of the operating valve device 31 at the rear of each car. Accordingly, the pressure in the brake pipe 15 is reduced at an emergency rate by the rapid flow of fluid under pressure from a point on each car to the piston chamber 123 of the operating valve device 31 at the rear of each car.

Due to the supply of fluid under pressure at an emergency rate to the piston chamber 123 of the operating valve device 31 at the rear end of each car, the piston 132 thereof is shifted to its fullest extent in the left-hand direction, thereby causing the pin valve 147 to close the passage 136 to prevent venting of fluid under pressure from the piston chamber 123 and the emergency vent valve 143 to be unseated. Thereupon, fluid under pressure is further released from the brake pipe at the rear end of each car to effect complete venting of the brake pipe 15 at an emergency rate.

The brake controlling valve device connected to the branch pipe 17 on the locomotive and the brake controlling valve devices 25 on the cars operate in response to the emergency reduction in brake pipe pressure to effect an emergency application of the brakes in the usual manner. As previously explained, the vent valve devices 33 are ineffective to so increase the rate of reduction in the quick action chamber 34 of the brake controlling valve device 25 over the normal rate of reduction sufficiently to prevent operation of the emergency portion of the brake controlling valve devices 25 in response to an emergency reduction of brake pipe pressure effected in the manner just described.

In effecting an emergency application of the brakes, the operator allows the handle 58 of the special brake valve 18 to remain in emergency position so that the operating valve devices 31 on the cars remain conditioned to vent fluid under pressure from the brake pipe 15 until it is reduced to atmospheric pressure. If desired, however, he may return the handle 58 of the brake valve 18 to release position before the pressure in the brake pipe 15 is reduced completely to atmospheric pressure and thereby conserve the amount of fluid under pressure released from the brake pipe during an emergency application of the brakes so as to enable recharge of the brake pipe in lesser time and consequently a more rapid release of the brakes following an emergency application.

Since the rate of supply of fluid under pressure to the piston chamber 123 of the operating valve devices 31 at the rear of each car of the train is more rapid in the case of an emergency application than in the case of a service application of the brakes, it will be apparent that the velocity of propagation of an emergency application impulse from the head of the train to the last car on the train will be more rapid than in the case of a service application. Accordingly, the automatic shifting of the handle 41 of the automatic brake valve 14 in lap position should necessarily be more prompt than in the case of a service application. As previously pointed out, the more rapid supply of fluid under pressure to the piston chamber 51 of the actuating cylinder 42 of the automatic brake valve 14 causes this to occur.

(e) *Release of the brakes following emergency application*

To effect a release of the brakes following an emergency application of the brakes, the operator first returns the handle 58 of the special brake valve 18 to release position, if he has allowed it to remain in emergency position. The actuator 21 on the locomotive tender and the operating valve devices 31 at the head and rear end of each of the cars of the train are thus correspondingly returned to their normal position in the same manner as described for the release following a service application of the brakes. After a slight interval of time sufficient to insure that the actuator 21 and operating valve devices 31 are restored to their normal positions, the operator returns the handle 41 of the automatic brake valve from lap position to running position and thereby restores the pressure in the brake pipe 15 to normal pressure to effect the release of the brakes.

(f) Conventional automatic operation

It will be readily apparent that if for some reason it is desired or found necessary not to employ the special brake valve 18 in controlling the brakes, the operator may employ the conventional automatic brake valve device 14 in controlling the brakes. Such operation is well known and well understood, and it is deemed unnecessary to describe such operation herein except to point out that the usual control of the brakes in a train brake equipment, such as the "AB" equipment, is not interfered with in any way by the provision of the special brake valve 18 and its associated propagation mechanism.

Since the speed of propagation of a brake control impulse from the head to the rear car of a train is much faster when the special brake valve 18 and associated control elements is employed as compared to the speed of propagation when the conventional automatic brake valve is employed, it is intended that the special brake valve 18 be employed normally and that the conventional pneumatic operation effected by the automatic brake valve 14 be employed in a standby capacity.

SUMMARY

Summarizing, it will be seen that I have disclosed a train brake equipment including a conventional type of fluid pressure operated equipment having a normally charged brake pipe, extending throughout the train of cars and effective to control the application and the release of the brakes on the cars of the train in response to variations of pressure in the brake pipe; and including means for propagating mechanically a brake control impulse or signal through the train to effect variations of the pressure in the brake pipe at a plurality of points along the length of the train to control the application and the release of the brakes in a manner to effect substantially simultaneous application of the brakes in the locomotive and cars of a train, regardless of its length, independently of the propagation of a pressure reduction wave through the brake pipe of the train.

The equipment on each of the cars comprises an operating valve at the head end and a similar operating valve at the rear end, the two valve devices being simultaneously operated through a connecting cable. Each operating valve on the cars has a projecting rotary operating rod which cooperates with a similar operating rod on the adjacent car at a point beneath the usual coupler joining two successive cars. An actuating device located at the rear of the locomotive tender is operated in response to the operation of a brake valve carried on the locomotive and includes a rotary operating rod which is shifted through a certain definite angle when the brake valve handle is shifted to a service application position and which is rotated through a greater angle when the brake valve handle is shifted to an emergency application position.

The rotation of the operating rod at the rear of the locomotive tender causes operation of the operating valve at the head end of the first car following the locomotive tender and simultaneously, through the cable connecting the operating valve devices at the head and rear end of the car, causes operation of the operating valve device at the rear of the first car following the locomotive tender. The operating rod of the operating valve at the rear end of the first car and the head end of the second car cooperate in such manner that when the operating valve at the rear of the first car is operated the operating valve at the head end of the second car is simultaneously operated. Thus the operating valves on all the cars are operated practically instantaneously.

The operation of the operating valve at the rear of each car effects a reduction of brake pipe pressure independently of the condition of the angle cock at the opposite ends of the brake pipe section on each car and thus once the brake pipe is charged to the normal pressure carried therein the application of the brakes is insured notwithstanding the accidental or malicious closure of one or more angle cocks in the brake pipe. This is a distinct advantage not present in the conventional fluid pressure control brake equipment because a closed angle cock in the brake pipe of a conventional fluid pressure brake equipment prevents the reduction of brake pipe pressure to the rear of the closed angle cock and thus prevents the application of the brakes if the angle cock is closed after the brake pipe is charged.

In the case of a service application, the operating valve at the rear end of each car is effective to reduce brake pipe pressure at a service rate and thus the brake controlling valves on the cars, controlled according to variations in brake pipe pressure, are operative to effect a service application of the brakes. In the case of an emergency application of the brakes, the operating valve at the rear end of each car is operated to effect reduction in brake pipe pressure at an emergency rate and accordingly the brake controlling valve device on the car is operated to effect an emergency application of the brakes.

Mechanism is provided for automatically shifting the handle of the conventional automatic brake valve on the locomotive from its normal running position to lap position to cut off the supply of charging fluid into the brake pipe. In the case of a service application, the operation to lap position is delayed a slight interval to insure the propagation of the application impulse through the train to the last car, thus aiding in effecting more nearly simultaneous application of the brakes on all cars of the train. In the case of an emergency application, the delay in automatically shifting the handle of the automatic brake valve from running to lap position is less than for a service application because of the faster propagation of a brake control impulse in an emergency application.

A further feature of the invention is the provision of a vent valve device on each car which is operated by the pull of the cable connecting the two operating valve devices at opposite ends of the car to increase the rate of reduction of the pressure in the quick action chamber of the conventional "AB" brake controlling valve device, or a similar brake controlling valve device, so that, notwithstanding the increase in the rate of reduction in brake pipe pressure over the usual service rate for a service application, the undesired operation of the emergency portion of the brake controlling valve device during a service application is prevented.

By mechanically propagating the brake control impulse from the head to the rear end of the train, the actual propagation time is relatively slight and thus the application of the brakes on the locomotive and all the cars in the train occurs substantially simultaneously.

My invention contemplates the control of the brakes normally by means of the mechanical propagation equipment. However, the arrangement thereof in the conventional fluid pressure operated equipment is such that, if desired, the brakes may be controlled in the conventional manner by the usual automatic brake valve.

While I have disclosed only one specific embodiment of my invention, it will be apparent that various omissions, additions or modifications of the embodiment shown may be made without departing from the spirit of my invention. It is accordingly not by intention to limit the scope of my invention except as it is necessitated by the scope of the prior art.

Having now described my invention, what I claim as new and desire to secure by Letters Patent, is:

1. A train brake equipment comprising an element on each car of the train shiftable out of a normal position thereof, fluid pressure operated, means on each car operated in response to the shifting of the element thereon out of its normal position for mechanically effecting a corresponding shifting of the element on a succeeding car, means at one point in the train for effecting the shifting of an element on a car out of its normal position whereby the elements on succeeding cars are serially shifted, and means controlled by the shifting of the elements on the cars out of the normal positions thereof for controlling the brakes on the train.

2. A train brake equipment comprising an element on each car shiftable out of a normal position thereof, means on one car operative by the shifting of the element thereon out of its normal position to effect the corresponding shifting of the element on a succeeding car, means at one point in the train for shifting the element on one car a certain degree out of its normal position for a service application and a greater distance out of its normal position for an emergency application whereby the elements on all the cars are serially shifted corresponding distances for service and emergency applications of the brakes, and means controlled according to the degree of shifting of the element on the cars out of the normal position thereof for selectively effecting a service application or an emergency application of the brakes on the car.

3. A train brake equipment comprising a normally charged brake pipe extending through all the cars of the train, means on each of the cars controlled by variations of pressure in the brake pipe for controlling the brakes on the car, an element on each car shiftable out of a normal position, fluid pressure operated means on each car effective in response to shifting of the element thereon out of its normal position to effect mechanically a corresponding shifting of the element on a succeeding car, means on one car of the train for effecting the shifting of the said element on that car out of its normal position, and means on each car responsive to the shifting of the said element on the car for effecting a local reduction of pressure in the brake pipe to cause the brake controlling means on the car to effect application of the brakes.

4. A train brake equipment comprising a normally charged brake pipe extending through all the cars of the train, brake controlling means on each of the cars operative in response to one rate of reduction of pressure in the brake pipe for effecting a service application of the brakes on the car and in response to a greater rate of reduction in brake pipe pressure to effect an emergency application of the brakes on the car, mechanically coupled elements on succeeding cars adapted to be serially shifted one degree out of a normal position for a service application and a greater degree out of a normal position for an emergency application of the brakes, and means on each car operative in response to the shifting of the shiftable element on the corresponding car to selectively effect a reduction in the pressure of the brake pipe at the said one rate or at the said greater rate depending upon the degree to which the shiftable element is shifted out of the normal position thereof.

5. A train brake equipment comprising mechanical means on each car of the train cooperative with and operated by operation of the mechanical means on a preceding car in the train, means on one car of the train for effecting operation of the mechanical means on the cars different degrees out of a normal position, brake controlling means on each of the cars operated selectively in response to the degree of operation out of normal position of the mechanical means of the corresponding car for effecting a service application or an emergency application of the brakes on the car, and means operated by operation of the mechanical means on the car for preventing undesired operation of the brake controlling means to effect an emergency application of the brakes when only a service application is intended.

6. A train brake equipment comprising a normally charged brake pipe extending through all the cars of the train, brake controlling means on each of the cars operative in response to one rate of reduction of pressure in the brake pipe for effecting service applications of the brakes on the cars and in response to a greater rate of reduction in brake pipe pressure to effect emergency applications of the brakes on the cars, mechanical means on each of the cars shiftable varying degrees out of a normal position, means on one car operative upon shifting of the mechanical means on that car out of its normal position for effecting a corresponding shifting of the mechanical means on a succeeding car whereby, upon operation of one of the mechanical means out of its normal position, the mechanical means on all succeeding cars are serially shifted to a corresponding degree, means on one of the cars for effecting the shifting of the mechanical means on that car one degree out of its normal position for a service application of the brakes and a greater degree out of its normal position for an emergency application of the brakes, means on each car selectively controlled in response to the shifting of the mechanical means thereon to said one degree or to the said greater degree out of its normal position for effecting a local reduction of pressure in the brake pipe at the said one rate or the said greater rate respectively, and means operative upon the shifting of the mechanical means on a car out of its normal position for preventing undesired operation of the brake controlling means on the corresponding car to effect an emergency application of the brakes when only a service application is intended.

7. A train brake equipment comprising in combination a normally charged brake pipe extending through the cars of the train; brake controlling valve means on each of the cars, said valve means having a service portion, an emergency portion and a quick action chamber; mechanical means on each car adapted to be serially operated one degree out of a normal position for a service application and a greater degree out of a normal position for an emergency application of the brakes; means on each car operative to effect reduction of brake pipe pressure at one rate or at a greater rate depending upon operation of the mechanical means on the car said one degree or said greater degree out of the normal position thereof respectively; and means operative in response to the operation of the mechanical means on a car out of its normal position for effecting a reduction of the pressure in the quick action chamber of the brake controlling means on the corresponding car to prevent undesired operation of the emergency portion thereof during a service application.

8. A train brake equipment comprising in combination a brake pipe extending through all the cars of the train; an automatic brake valve having a normal position in which a charging communication is maintained for charging said brake pipe to the normal pressure carried therein, a lap position in which said charging communication is closed, a service position in which a reduction of the pressure in the said brake pipe is effected at a service rate, and an emergency position in which a reduction of brake pipe pressure is effected at an emergency rate; brake controlling means on each of the cars selectively operable in response to a service rate or an emergency rate of reduction of brake pipe pressure to effect a service application and an emergency application, respectively, of the brakes on the car; mechanical elements on each of the cars adapted to be serially operated out of a normal position; means on each of the cars effective to cause reduction of brake pipe pressure locally on the car at a service rate in response to one degree of operation of the mechanical means on the car out of its normal position and operative to effect a local reduction of brake pipe pressure at an emergency rate in response to shifting of the mechanical means a greater degree out of its normal position; an actuating device for effecting operation of the mechanical means on one of the cars at the head end of the train whereby the mechanical means on the succeeding cars are serially operated to a corresponding degree out of their normal positions, a device effective to operate said automatic brake valve to lap position; and manually operable means operative out of a normal position to effect the operation of the said actuating device and the said operating device.

9. A train brake equipment comprising a brake pipe extending through all the cars of the train, an automatic brake valve device having a normal position in which it establishes a communication through which the said brake pipe is charged to the normal pressure carried therein and a lap position in which the said charging communication is closed, an operating device for operating said brake valve to lap position, brake controlling means on each of the cars operative in response to a reduction of the pressure in the brake pipe for effecting an application of the brakes, mechanical means on each of the cars mechanically coupled to the mechanical means on adjacent cars and adapted to be serially operated, an actuating device on one car of the train operative to cause operation of the mechanical means on one car whereby the mechanical means on succeeding cars are serially operated a corresponding degree out of the normal position thereof, means on each of the cars operative in response to the shifting of the mechanical means on the cars out of normal position to effect a reduction of brake pipe pressure and consequent application of the brakes, and manually operative means for effecting operation of the operating device and the said actuating device.

10. A train brake equipment comprising a brake pipe extending through all the cars of the train, an automatic brake valve device having a normal position in which it establishes a communication through which the said brake pipe is charged to the normal pressure carried therein and a lap position in which the said charging communication is closed, an operating device for operating said brake valve device to lap position, brake controlling means on each of the cars operative in response to a reduction of the pressure in the brake pipe for effecting an application of the brakes, mechanical means on each of the cars adapted to be serially operated, an actuating device on one car of the train operative to cause operation of the mechanical means on one car whereby the mechanical means on succeeding cars are serially operated a corresponding degree out of a normal position thereof, means on each of the cars operative in response to the shifting of the mechanical means on the cars out of normal position to effect a local reduction of brake pipe pressure on the car and the consequent application of the brakes, manually operative means for effecting operation of the operating device and the said actuating device, and timing means for delaying for a certain limited time the operation of the operating device to operate the automatic brake valve to lap position following operation of the manually operable means.

11. A train brake equipment comprising a brake pipe extending through all cars of the train, brake controlling means on each of the cars selectively operable in response to different rates of reduction of pressure in the brake pipe to effect a service application or an emergency application of the brakes on the car, an automatic brake valve device for effecting variations of pressure in the brake pipe so as to cause operation of the brake controlling means to effect a service application or an emergency application of the brakes selectively, means on each of the cars for effecting locally on each car variations in the pressure in the brake pipe to cause operation of the brake controlling means to selectively effect a service application or an emergency application of the brakes, and mechanical means on each car cooperatively associated with the mechanical means on adjacent cars, effective upon operation thereof various degrees out of the normal position to cause operation of the last said means, and means on one car of the train for effecting operation of the mechanical means on one car whereby the mechanical means on succeeding cars are serially operated.

12. A train brake equipment comprising a brake pipe extending through all the cars of the train and normally charged with fluid under pressure, brake controlling means on each of the cars operative in response to the reduction of pressure in the brake pipe to effect an application of the brakes on the cars, a brake valve device on one car of the train for effecting a reduction of the pressure in the brake pipe to cause operation of the brake controlling means on all the cars, a valve in said brake pipe effective when closed to prevent the reduction of pressure in the brake pipe in response to the operation of the brake valve device, means on each car for effecting a local reduction of pressure in the brake pipe independently of the closure of the said valve, and means for effecting the operation of the last said means on each of the cars whereby to insure an application of the brakes on all the cars of the train notwithstanding the closure of said valve in the brake pipe.

13. A train brake equipment comprising a brake pipe extending through all the cars of the train and normally charged with fluid under pressure, brake controlling means operative in response to a reduction of pressure in the brake pipe to effect an application of the brakes, valve means on each car for effecting locally on each car a reduction of the pressure in the brake pipe, a pair of rotary operating elements on each car located respectively at opposite ends of the car, one of which is effective upon rotation out of a normal position to effect operation of the valve means on the car and the other of which is operated a corresponding degree in response to the operation of the valve means, the rotary operating elements of succeeding cars cooperating in such manner that when the valve means on one car is operated the valve means on succeeding cars are serially operated correspondingly, and means for effecting operation of the valve means on a car at the head end of the train.

14. An actuating device comprising a casing having a chamber constantly open to atmosphere through a restricted port, fluid pressure responsive means subject to the pressure in said chamber and shiftable linearly in one direction out of a normal position, resilient means yieldingly urging the said fluid pressure responsive means to its normal position, a second resilient means effective to yieldingly resist movement of the fluid pressure responsive means out of its normal position only after it has shifted a certain uniform degree out of its normal position, said restricted port being such as to prevent a sufficient build-up of pressure in the said chamber to overcome said second resilient means when fluid under pressure is supplied thereto at one rate and ineffective to prevent shifting of the piston out of its normal position and overcoming both said first and said second resilient means in response to the supply of fluid under pressure at a higher rate to said chamber, and a rotary element cooperating with said fluid pressure responsive means and shifted rotarily through an angle corresponding to the degree to which the fluid pressure responsive means is shifted out of its normal position.

15. An operating device comprising a rotary operating element, fluid pressure responsive means shiftable linearly out of a normal position to different degrees to displace said rotary operating element correspondingly out of its normal position, resilient yielding means for yieldingly resisting displacement of the rotary operating element in opposite directions out of its normal position, two valves one of which is effective when operated to supply fluid under pressure to the fluid pressure responsive means at one rate and the other of which is effective when operated to supply fluid under pressure to the fluid pressure responsive means at a greater rate, means effective to prevent shifting of the fluid pressure responsive means more than a certain uniform degree out of a normal position when fluid under pressure is supplied thereto at said one rate and ineffective to prevent shifting of the fluid pressure responsive means a greater distance out of its normal position when fluid under pressure is supplied thereto at said greater rate, and means for selectively effecting operation of said one valve or both of said valves.

16. In combination, a pipe normally charged with fluid under pressure, a vent valve effective when operated to reduce the pressure in the said pipe, a rotary operating element, a fluid pressure responsive means shiftable out of a normal position in response to the increase of pressure acting thereon to effect rotation of said rotary element and operation of the vent valve to reduce the pressure in said pipe, and means for supplying fluid under pressure to the fluid pressure responsive means.

17. A car brake equipment, comprising a brake pipe normally charged with fluid under pressure, brake controlling means on the car operative in response to a reduction of pressure in the brake pipe to effect an application of the brakes, a valve device at one end of the car operative to effect a reduction of the pressure in the brake pipe, an operating element for said valve device extending to the opposite end of the car, a first rotary operating element at the said opposite end of the car for shifting said operating element to effect operation of the said valve device, and a second rotary operating element operated by the said valve device for cooperating with the rotary operating element on an adjacent car corresponding to said first rotary element.

18. A train brake equipment comprising a normally charged brake pipe extending through all the cars of the train, means on each of the cars controlled by variations of pressure in the brake pipe for controlling the brakes on the car, an element on each car extending from end to end of the car and shiftable out of a normal position thereof, means on each car effective in response to the shifting of the element on the corresponding car out of its normal position to mechanically effect a corresponding shifting of the element on the next succeeding car in the train and also to effect a local variation of pressure in the brake pipe resulting in operation of the brake control means to effect application of the brakes on the car, and means under the control of the operator for effecting shifting of the element on a car at the head end of the train out of its normal position.

19. A train brake equipment comprising a brake pipe extending through all the cars of the train and normally charged with fluid under pressure, means on each car operatively responsive to a reduction from the normal pressure in the brake pipe for effecting application of the brakes on the car, a pair of rotary elements for each car located respectively at opposite ends of the car and rotarily movable in opposite directions away from a normal position thereof, said rotary elements being so constructed and arranged that the rotary movement of a rotary element at one end of one car effects corresponding rotary movement of the rotary element on the adjacent end of a succeeding car, a valve device on each car adapted to be operated, in response to rotation of the rotary element at one end of the same car, to vent fluid under pressure from the brake pipe and thereby effect a reduction of the pressure in the brake pipe, and means on each car responsive to the pressure of the fluid vented from the brake pipe by the valve device on the corresponding car for effecting rotary movement of the rotary element at the end of the car opposite to said one end.

20. A train brake equipment comprising a brake pipe extending through all the cars of the train and normally charged with fluid under pressure, means on each car operatively responsive to a reduction from the normal pressure in the brake pipe for effecting application of the brakes on the car, a pair of rotary elements for each car located respectively at opposite ends of the car and rotarily movable in opposite directions away from a normal position thereof, said rotary elements being so constructed and arranged that the rotary movement of a rotary element at one end of one car effects corresponding rotary movement of the rotary element on the adjacent end of a succeeding car, a valve device on each car adapted to be operated, in response to rotation of the rotary element at one end of the same car, to vent fluid under pressure from the brake pipe and thereby effect a reduction of the pressure in the brake pipe, and means on each car responsive to the pressure of the fluid vented from the brake pipe by the valve device on the corresponding car for effecting rotary movement of the rotary element at the end of the car opposite to said one end, the rotary displacement of the rotary element at the said opposite end of the car out of its normal position corresponding to the rotary displacement of the rotary element at the said one end out of its normal position.

21. A car brake equipment comprising a brake pipe normally charged with fluid under pressure, means operatively responsive to reduction of the pressure in the brake pipe for effecting an application of the brakes on the car, a pair of valve devices located respectively at opposite ends of the car, an element extending from end to end of the car and shiftable in opposite directions away from a normal neutral position thereof, said valve devices being so constructed and arranged that when the said element is shifted in one direction out of its normal neutral position the valve device at one end of the car is operated to effect a reduction of the pressure in the brake pipe while the valve device at the other end is nonoperative, and when the said element is shifted in the opposite direction out of its normal neutral position the valve device at the other end of the car is operated to effect a reduction of the pressure in the brake pipe while the valve device at the said one end is non-operative.

22. A train brake equipment comprising a brake pipe extending through all the cars of the train and normally charged with fluid under pressure, means on each of the cars operatively responsive to reduction of the pressure in the brake pipe for effecting an application of the brakes on the cars, an element on each car extending from end to end thereof and shiftable longitudinally of the car in opposite directions away from a normal neutral position thereof to selectively cause operation of the valve device at one end or at the other end to effect a reduction of the pressure in the brake pipe resulting in application of the brakes on the car, a pair of rotary elements for each car located respectively at opposite ends of the car and so constructed and arranged in cooperative association with the rotary elements of preceding and succeeding cars in the train that the rotary element at one end of one car and the rotary element at the adjacent end of another car rotate together, the rotary elements at opposite ends of each car being so arranged that when the rotary element at one end of the car is shifted rotarily out of a normal position thereof in one direction the said element on the car is shifted longitudinally out of its normal position in one direction and when the rotary element at the opposite end of the car is rotarily shifted out of its normal position in the opposite direction the said element on the car is shifted longitudinally out of its normal position in the opposite direction, each of said valve devices being so constructed and arranged as to cause rotary movement of the rotary element at the corresponding end of the car out of its normal position simultaneously with operation thereof to effect a reduction of the pressure in the brake pipe.

23. A train brake equipment comprising a brake pipe extending through all of the cars of the train and normally charged with fluid under pressure, means on each of the cars operatively responsive to a reduction of the pressure in the brake pipe for effecting an application of the brakes on the cars, a pair of valve devices for each car located respectively at opposite ends of the car, each valve device having a rotary operating element rotarily shiftable in opposite directions out of a normal position thereof, means associating the two valve devices on each car in such manner that rotation of the rotary element of the valve device at one end of a car in one direction out of its normal position causes operation of the valve device at the opposite end of the car to effect a reduction of the pressure in the brake pipe and rotary movement of its associated rotary element in a corresponding direction, and that rotation of the rotary element of the valve device at the said opposite end of the car in the opposite direction causes operation of the valve device at the said one end of the car to effect a reduction of the pressure in the brake pipe and rotary movement of its associated rotary element in a corresponding direction, the rotary operating elements of valve devices at the adjacent ends of successive cars in the train cooperating in such a manner that rotation of the rotary element on one car effects rotation of the rotary element on the other car whereby the valve devices on successive cars of the train are serially operated.

BURTON S. AIKMAN.

CERTIFICATE OF CORRECTION.

Patent No. 2,170,229.                                              August 22, 1939.

BURTON S. AIKMAN.

It is hereby certified that error appears in the printed specification of the above numbered patent requiring correction as follows: Page 14, first column, line 13, for the word "can" read car; and that the said Letters Patent should be read with this correction therein that the same may conform to the record of the case in the Patent Office.

Signed and sealed this 26th day of December, A. D. 1939.

(Seal)                                                      Henry Van Arsdale,
Acting Commissioner of Patents.